(12) United States Patent
Guigan

(10) Patent No.: US 10,278,339 B2
(45) Date of Patent: May 7, 2019

(54) DEVICE FOR PROTECTION AGAINST TERRESTRIAL GASTROPODS

(71) Applicant: SYLOPIDO, Thoury Ferrotes (FR)

(72) Inventor: Sylvie France Marie Claire Guigan, Thoury Ferrotes (FR)

(73) Assignee: SYLOPIDO, Thoury Ferrotes (FR)

(*) Notice: Subject to any disclaimer, the term of this patent is extended or adjusted under 35 U.S.C. 154(b) by 213 days.

(21) Appl. No.: 15/126,161

(22) PCT Filed: Mar. 12, 2015

(86) PCT No.: PCT/EP2015/055194
§ 371 (c)(1),
(2) Date: Sep. 14, 2016

(87) PCT Pub. No.: WO2015/136042
PCT Pub. Date: Sep. 17, 2015

(65) Prior Publication Data
US 2017/0086393 A1 Mar. 30, 2017

(30) Foreign Application Priority Data

Mar. 14, 2014 (FR) .................................... 14 00625

(51) Int. Cl.
A01G 13/10 (2006.01)
A01M 29/30 (2011.01)

(52) U.S. Cl.
CPC ........... *A01G 13/105* (2013.01); *A01M 29/30* (2013.01)

(58) Field of Classification Search
CPC ........ A01G 13/05; A01G 13/10; A01M 29/30
See application file for complete search history.

(56) References Cited

U.S. PATENT DOCUMENTS

| 4,319,423 A | 3/1982 | Judd | |
|---|---|---|---|
| 5,669,187 A * | 9/1997 | Bushong | A01M 29/30 52/101 |
| 2014/0223805 A1* | 8/2014 | Chilton | A01G 13/105 43/131 |

FOREIGN PATENT DOCUMENTS

| AT | 6 063 U1 | 4/2003 | |
|---|---|---|---|
| DE | 3336133 A1 * | 4/1985 | ........... A01G 13/105 |
| DE | 3604321 C1 * | 2/1987 | ........... A01G 13/105 |
| DE | 10018648 A1 * | 10/2001 | ........... A01G 13/105 |
| DE | 10045330 A1 * | 4/2002 | ........... A01G 13/105 |
| DE | 102 08 554 A1 | 9/2003 | |
| DE | 20 2005 003167 U1 | 6/2005 | |

(Continued)

OTHER PUBLICATIONS

International Search Report issued in PCT/EP2015/055194 dated Jul. 10, 2015 (2 pages).

(Continued)

*Primary Examiner* — Kristen C Hayes
(74) *Attorney, Agent, or Firm* — Osha Liang LLP

(57) ABSTRACT

A device for protecting an area against terrestrial gastropods includes at least one barrier that includes a base for securing the barrier to the periphery of the area to be protected, a ceiling wall connected to the base, a grid extending along and spaced apart from the ceiling wall, a space between the ceiling wall and the grid, and at least one blocking means for preventing the gastropods, of the size category targeted by the barrier, from crawling in the said space. Barriers targeting small gastropods can be integrated into barriers targeting large gastropods.

19 Claims, 11 Drawing Sheets

(56) References Cited

FOREIGN PATENT DOCUMENTS

| | | |
|---|---|---|
| EP | 0232914 A1 | 8/1987 |
| EP | 0307690 A1 | 3/1989 |
| FR | 2821713 A1 | 9/2002 |
| GB | 2286759 A | 8/1995 |

OTHER PUBLICATIONS

Written Opinion of the International Searching Authority issued in PCT/EP2015//055194 dated Jul. 10, 2015 (5 pages).
French Search Report issued in French Application No. 1400625 dated Nov. 4, 2014 (2 pages).

\* cited by examiner

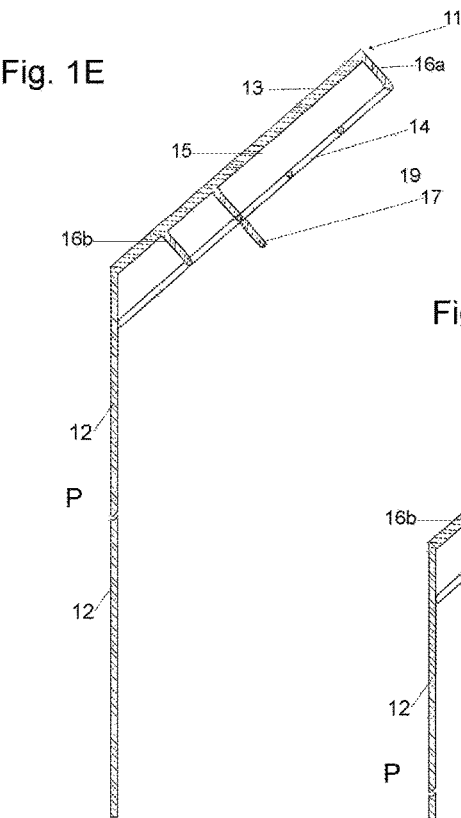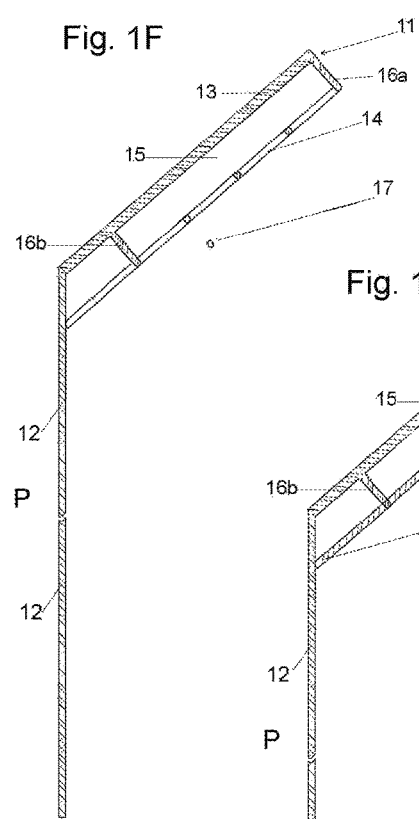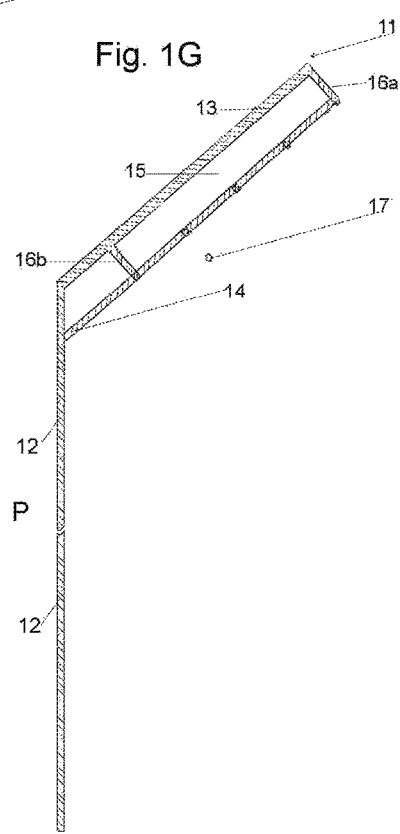

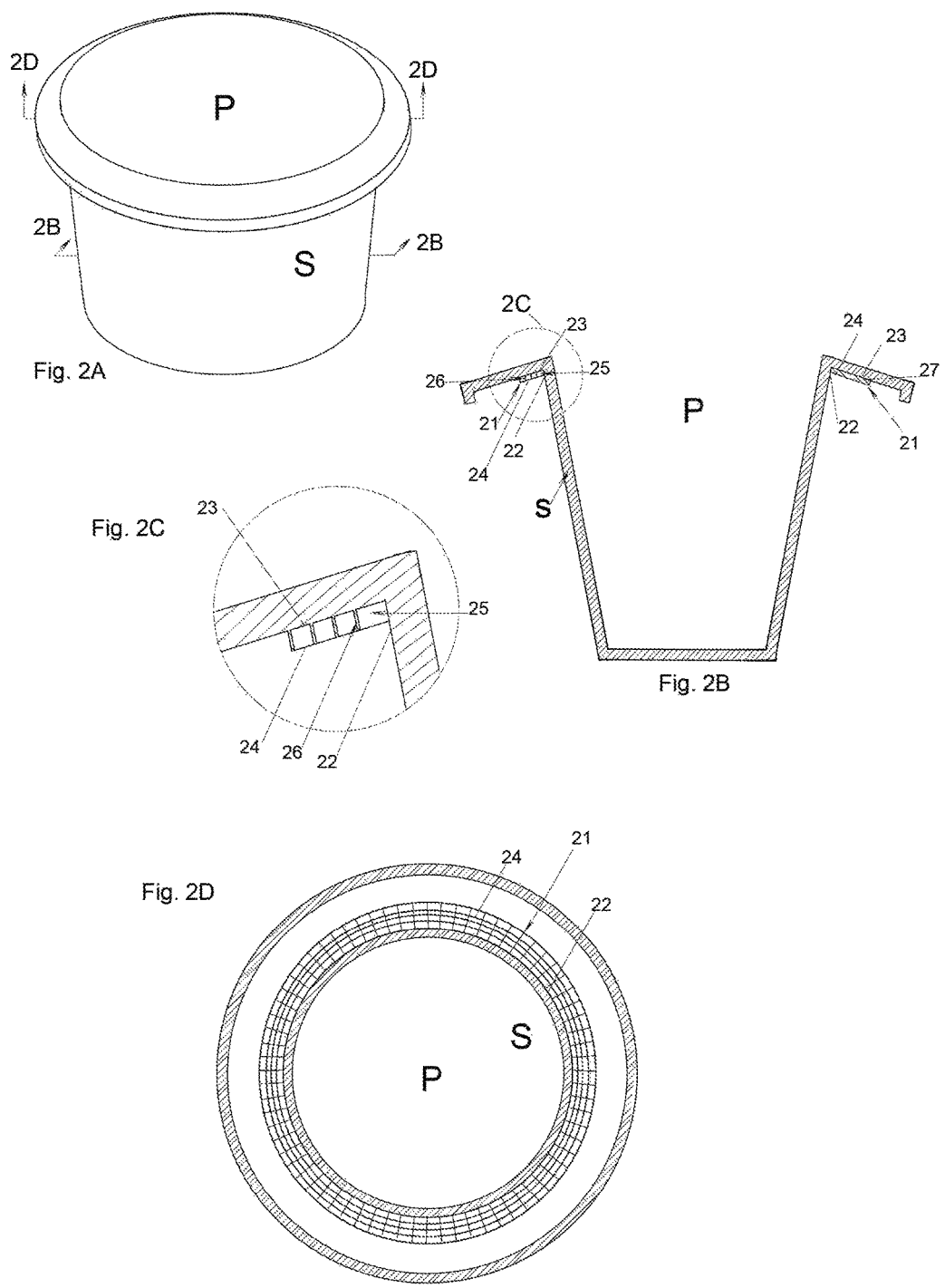

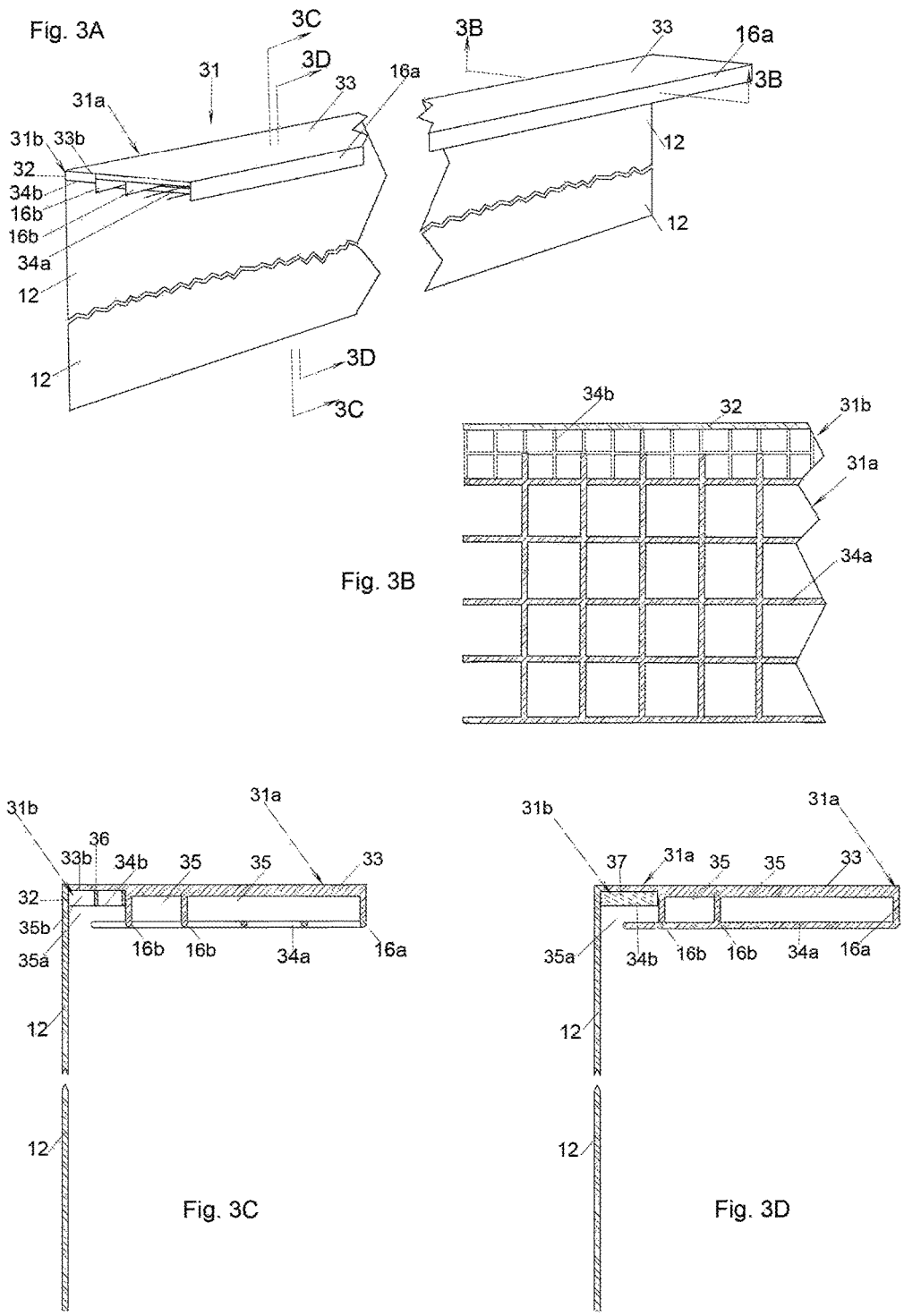

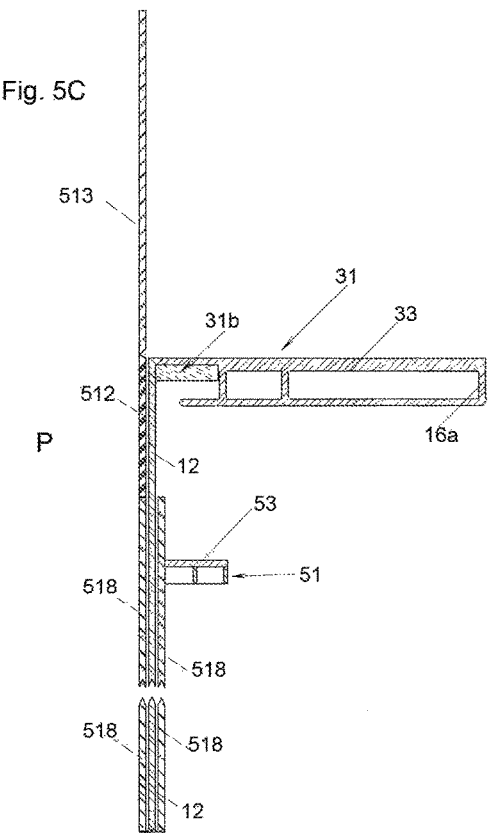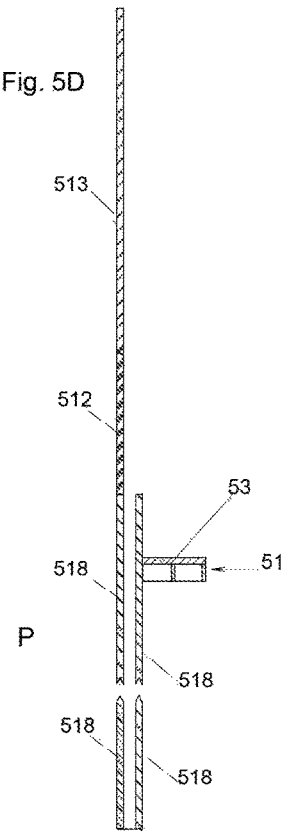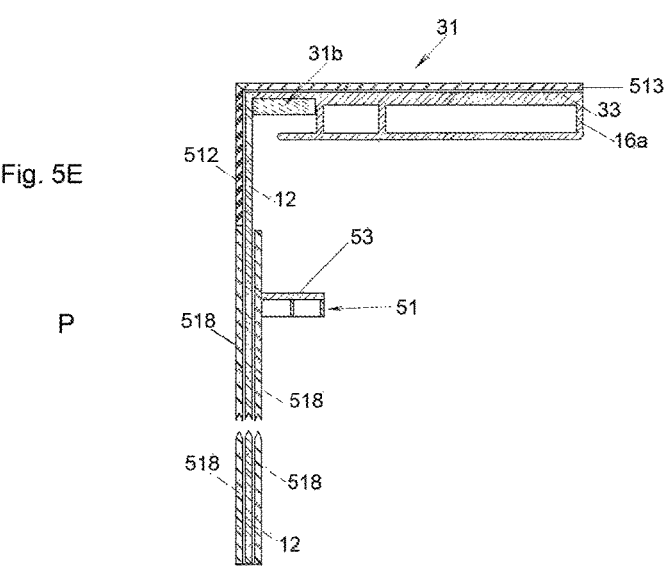

DEVICE FOR PROTECTION AGAINST TERRESTRIAL GASTROPODS

FIELD OF THE INVENTION

The present invention concerns the field of devices for protection of an area, for example an area of plants, against invasion by slugs, snails and other terrestrial gastropods.

PRIOR ART

A number of species of terrestrial gastropods, and in particular slugs, are considered as fearsome predators of vegetable gardens and large plantings. In fact, these creatures, of unrivalled voracity, like the same plants as humans. Moreover, their eminently flexible bodies and their crawling and adhering mode of locomotion enable them to travel over virtually any surface and through interstices much narrower than their own size.

The problem has become greater with the growing importance of new agricultural growing methods that dictate the reduction of soil preparation and its protection by ground cover plants, two conditions ideal for the life and the reproduction of these gastropods.

Pesticides are frequently used to destroy these creatures, but these products are toxic for the environment. Dogs and birds, for example, can be fatally poisoned by the ingestion of a small quantity of such products. Moreover, the destruction of the gastropods is undesirable because these creatures play a key role in the economic exploitation of the soil: they participate in the decomposition of organic material and the formation of humus.

Other products that are less toxic than pesticides are also used, for example ash or salt. However, the already low efficacy of these products is further reduced in wet weather, i.e. when slugs become active.

It is also known to use "beer traps". These are containers filled with beer in which the slugs are drowned when attempting to drink. These traps attract numerous gastropods into the vicinity of the area to be protected that would otherwise never have ventured into these vicinities. They must moreover be regularly refilled with beer and the traps filled with dead slugs are unpleasant to clean.

Copper coatings are occasionally used as deterrent obstacles, but this metal is costly and only a partial deterrent.

It is also known to use mechanical barriers that have two walls with strong declivities joined at a drastically obtuse angle. These barriers are intended to prevent gastropods crawling past the obtuse angle, but the deterrent efficacy of this type of obstacle is only temporary.

The patent document GB2286759A describes a vertical wall having a downwardly directed rim on the side opposite to the plants to be protected, but the drawings appended to this patent show devices that can easily be circumvented by slugs. Slugs can in fact easily attach the posterior part of their foot to the vertical wall of the device and then attempt to attach themselves to the external wall of the downwardly directed rim of this wall, straddling the space that separates this vertical wall from this downwardly directed rim. This external part of the downwardly directed rim then offers them easy access to the face of the vertical wall situated on the same side as the prohibited area. The document FR2821713 describes a barrier for protecting plants of the same type as that from GB2286759A.

The patent documents EP0232914A1 and EP0307690A1 describe walls including strips carpeted with a multiplicity of needles or bristles intended to stop the advance of the gastropods but the quantity of material necessary for the making of these rows of needles or bristles is often prohibitive.

Problem to be Solved

The problem to be solved concerns the protection of an area, notably an area of plants, against terrestrial gastropods, i.e. against these creeping mollusks that have the reputation of being able to travel over virtually all surfaces and through the smallest interstices, thanks to their flexible, muscular and sticky foot.

The problem is also increased by the diverse sizes of these creatures, especially slugs. In fact, slugs of all species are very small when they emerge from their egg, but once adult most species able to cause damage in vegetable gardens can be classified into two large size categories:

species of large size, for example Limax maximus, Arion rufus or Arion vulgaris, that measure between 10 cm and 20 cm long and between 1 cm and 2 cm high;

species of small size, for example Arion hortensis measuring approximately 2 cm to 3 cm long and approximately 3 mm high and Deroceras reticulatum measuring approximately 3 cm to 5 cm long and approximately 5 mm high.

SUMMARY OF THE INVENTION

One or more embodiments of the claimed invention provide an effective and practical device for protection against terrestrial gastropods, and notably slugs, whilst protecting biodiversity, i.e. without using pesticides and without destroying these creatures, which have a place in the ecosystem.

One or more embodiments of the claimed invention consist in a device for protection of an area, for example an area of plants, against terrestrial gastropods. This device comprises at least one barrier including:

a base for securing the barrier to the periphery of the area to be protected, a wall, also referred to hereinafter as the "ceiling wall", joined to the base, a grid extending along the ceiling wall and spaced therefrom, and in particular substantially parallel to the ceiling wall, a space between the grid and the ceiling wall, blocking means preventing gastropods in the size category targeted by the barrier from moving into this space.

The base and the ceiling wall have either no interstices (in this case they are solid surface) or interstices sufficiently small to prevent gastropods of the size category targeted by the barrier from slipping through.

When the barrier is fixed to the periphery of the area to be protected, the ceiling wall may be oriented toward the outside of the area to be protected, in a direction diverging from the vertical, the grid being then disposed underneath the ceiling wall. Alternatively, the ceiling wall may be oriented vertically. In this case, the grid also extends substantially vertically and when the barrier is in use the grid is on the side opposite to the area to be protected, i.e. the ceiling wall is situated between the area to be protected and the grid.

The base may comprise a wall one edge of which is intended to be partially buried in the soil or fixed to a support, and the other edge of which is intended to be joined over all its length to the ceiling wall.

The base and the ceiling wall may also be integrated into a support delimiting the periphery of the area to be protected, for example the external wall of a plant pot. In particular, the base may be formed by the lateral wall of the pot and the ceiling wall may be formed by the rim at the top of the pot.

The ceiling wall may be aligned with the wall of the base or at an angle to the latter.

In some embodiments, when the barrier is in position around the area to be protected, the wall of the base may extend in a substantially vertical direction. The ceiling wall may be at an angle to the wall of the base. When this angle is a right angle (i.e. approximately 90°), the ceiling wall extends in a substantially horizontal direction. When this angle is an obtuse angle, the ceiling wall extends obliquely toward the outside of the area to be protected and upwards. When this angle is an acute angle, the ceiling wall extends obliquely toward the outside of the area to be protected and downwards. The ceiling wall may equally well be aligned with the wall of the base, in which case it extends in a substantially vertical direction.

In some embodiments, the grid comprises meshes of predetermined section that surround empty spaces (or inter-mesh spaces) with predetermined dimensions. The dimensions and the surface density of these meshes determine the attachment area of the grid. The dimensions of these meshes and of these empty spaces are chosen to prevent creatures of the size category targeted by the barrier from crawling by attaching themselves to the external face of the grid. In fact, for a terrestrial gastropod to succeed in crawling in a direction that requires the use of forces diverging from its own weight, the wall to which it attaches itself must have an attachment area sufficiently large in relation to its foot secreting sticky mucus.

In some embodiments, the dimensions of the empty spaces of the grid are also sufficiently small to prevent the gastropods from crawling by attaching themselves to the internal face of the ceiling wall, facing the internal face of the grid.

In some embodiments, the height of the space separating this grid from the ceiling wall that faces it is sufficiently large to prevent the gastropods from crawling by attaching themselves simultaneously to the external face of the grid and the internal face of the ceiling wall.

In some embodiments at least one rod is disposed longitudinally facing the external face of the grid at a sufficiently small distance to prevent the gastropods from slipping between the grid and the rod. The rod may be fixed to the ceiling wall by lugs at the ends of the rod. The rod may have an attachment area sufficiently small to prevent gastropods from attaching themselves to it transversely.

Blocking means used separately or in combination and intended to prevent gastropods of the targeted category from crawling in this space may be envisaged.

The blocking means may consist in a predetermined height of the space between the grid and the ceiling wall, this predetermined height being sufficiently small to deter and/or to prevent gastropods from slipping into the space.

Other blocking means may consist in at least one longitudinal partition oriented downwards in the space (i.e. in the direction of the height of this space), compartmentalizing the space longitudinally and featuring either no interstices or interstices that are sufficiently small to prevent gastropods of the size category targeted by the barrier from slipping through. The positioning of a longitudinal partition in the vicinity of the frontier between the base and the ceiling wall advantageously makes it possible to prevent gastropods from advancing as soon as they reach the edge of this ceiling wall.

Further blocking means may consist in longitudinal and transverse partitions that cross over and are oriented downwards in the space and compartmentalize the latter. This multiple partitioning of the space blocks the advance of gastropods of lower height than the space.

Further blocking means may consist in at least one intermediate grid disposed along and at a distance from the ceiling wall and in particular substantially parallel to the ceiling wall. This intermediate grid compartmentalizes the space into at least two sub-spaces. It makes it possible to prevent or to deter the gastropods of the targeted size category from circulating in said space. Moreover, the limited height of the sub-spaces makes it possible to prevent or deter gastropods of smaller size than the aforementioned size category from slipping into the sub-spaces. The heights of the sub-spaces provided within the initial space may be different so as to block the progression of gastropods of different sizes. The two grids may have identical dimensions and be disposed so that their meshes are aligned when they are viewed in a direction orthogonal to the grids to prevent gastropods from supporting themselves on one grid in order to move onto the other.

In some embodiments, the width of the grid is predetermined to prevent gastropods from straddling it by attaching their foot to one side and the other of the grid.

In some embodiments, and in particular when the ceiling wall is oriented in a direction diverging from the vertical, the height of the base is predetermined to prevent gastropods from reaching the external face, or upper face, of the ceiling wall and adopting an upright position on their foot, before even reaching the base.

In some embodiments, barriers of different sizes may be fitted into each other in order to protect an area against gastropods belonging to different size categories.

In some embodiments, the device comprises a plurality of juxtaposed barriers and means for joining two adjacent barriers.

These junction means are intended to facilitate the alignment of the adjacent barriers and to prevent gastropods from slipping into the gap between them.

A first example of the junction means may make it possible to connect two barriers that can be precisely aligned. In this embodiment, the base of each barrier comprises a substantially plane wall at one end and at the other end a bracket intended to cooperate with the plane wall of the base of the adjacent barrier, in accordance with the principle of a sliding connection. A barrier targeting small gastropods is fixed to the wall of the bracket situated on the side opposite the area of plants to be protected. The wall of the bracket situated on the same side as the area of plants to be protected is joined to a base intended to cover the ends of two adjacent bases situated above this bracket. This base extending the wall of the bracket is itself extended by a wall referred to as the ceiling wall because it has the same properties as the ceiling walls of the barriers. This ceiling wall is pressed against the ends of the ceiling walls of two joined barriers that it overlies.

A second example of the junction means can make it possible to connect two adjacent barriers when the nature of the ground or the configuration of the site prevents their accurate alignment. This second example of the junction means has the same properties as the junction means described above, except that the base and the ceiling wall are replaced by a barrier targeting large slugs.

A third example of the junction means may comprise a connecting barrier straddling the two joined barriers. This third example of the junction means includes a sliding bracket, a base and a ceiling wall analogous to those of the first example of the junction means. On the side opposite the area of plants to be protected, the upper edge of the sliding bracket is a few millimeters below the two joined grids. This edge is joined to at least one grid, referred to as the connecting grid, having the same width and the same mesh dimensions as the grids of the two joined barriers. Its free edge is joined over all its length to the base of a partition the height of which is approximately equal to the distance separating the upper edge of the sliding bracket from the grids of the joined barriers. The sub-space created between the grids of the joined barriers and the connecting grid is sufficiently high to prevent crawling slugs from straddling the superposed grids and sufficiently small to prevent slugs crawling between these superposed grids. The partition joined to the free end of the connecting grid is connected to the two joined barriers or to the ceiling wall of the junction means by clips, ties, staples or adhesive tapes. The base, the ceiling wall, the connecting grid and the partition situated at its free end constitute the components of this connecting barrier, which is associated with the sliding bracket to constitute the third example of the junction means.

This third example of the junction means consisting in this manner of a sliding bracket and the nesting of the connecting barrier around the two joined barriers prevents slugs reaching the junction area of the two joined barriers.

These three examples of the junction means prevent small and large gastropods from slipping between two adjacent barriers whether the latter are aligned accurately or inaccurately.

This protection device therefore guarantees effective protection of an area against terrestrial gastropods whilst respecting biodiversity, because the gastropods that reach an enclosure produced with a plurality of joined barriers are not slain. They are merely obliged to turn back. Indeed, the interstices of the enclosure and the barriers are too narrow for the gastropods to slip through. The barriers are too wide and too high to be straddled and all the faces of their ceiling walls and their grids are inaccessible pathways.

BRIEF DESCRIPTION OF THE FIGURES

The present device will be better understood on reading the following detailed description of embodiments given by way of nonlimiting example. This description refers to the appended drawings, in which:

FIGS. 1E to 1G show three views of a variant of the protection device shown in FIGS. 1A to 1D;

FIGS. 2A to 2D show diverse views of one example of a second embodiment of a protection device targeting small slugs integrated into a pot plant;

FIGS. 3A to 3D show diverse views of one example of a third embodiment of a protection device intended to be partially buried in the soil and aimed at stopping slugs of two different size categories;

FIGS. 5A to 5E show five views of junction means intended to connect two adjacent barriers that are accurately aligned;

DETAILED DESCRIPTION OF EMBODIMENTS OF THE DEVICE

First Embodiment

Figure 1A:
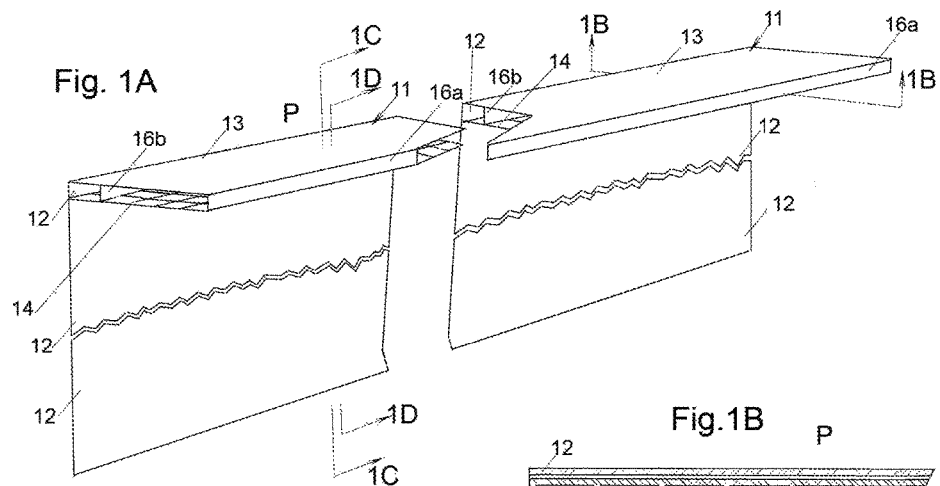
FIGS. 1A to 1D show various views of one example of a first embodiment of a device for protecting against large slugs that is intended to be partially buried in the soil.
Figure 1B:
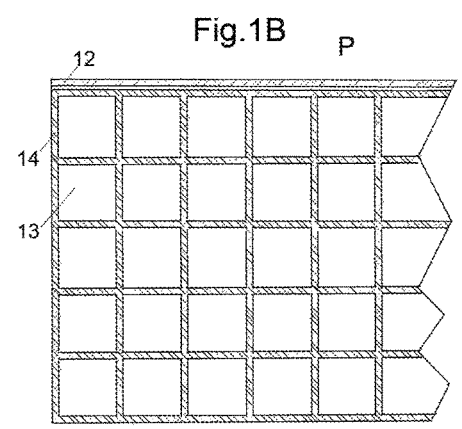
Figure 1C:
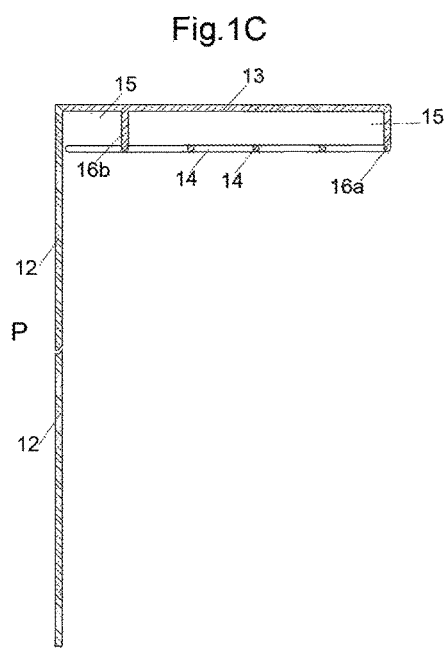
Figure 1D:
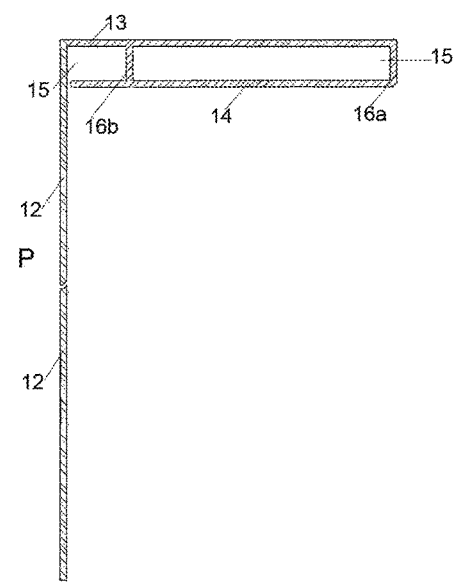

A first embodiment of the protection device is shown in:

FIG. 1A, which is a perspective view of a barrier 11 intended to be partially buried in the soil (not represented), FIG. 1B, which is a view in longitudinal and horizontal section at the level of the grid 14 from FIG. 1A, FIG. 1C, which is a view in cross section of the barrier 11, the section being taken at the level of the empty spaces situated between the meshes of the grid 14, FIG. 1D, which is a view in cross section of the barrier, the section being at the level of the portions of the meshes of the grid 14 perpendicular to the base.

This protection device is intended to be partially buried in the soil to protect a vegetable garden area P against large gastropods.

It comprises a barrier 11 including a thin and elongate base 12 intended to be placed substantially vertically in the soil. Its upper edge is intimately joined over all its length to a ceiling wall 13 oriented substantially perpendicularly to the base in the direction away from the area P of plants to be protected. When the base 12 is buried in the soil, the ceiling wall 13 is substantially horizontal.

The edge of this ceiling wall 13 farthest from the base is joined over all its length to a partition 16a that descends vertically. This partition 16a can be approximately 5 mm high, for example.

The lower edge of this partition 16a is joined to an approximately horizontal grid 14 with substantially the same perimeter as the ceiling wall 13. The grid 14 faces and is situated underneath the ceiling wall 13. In the embodiment of FIGS. 1A to 1D, the grid 14 is approximately 50 mm wide, for example. It consists of a grid having meshes surrounding empty spaces of approximately square shape with a side length of 13 mm, for example. The cross section of the bars of the grid 14 has a diameter of approximately 1 mm, for example.

Another substantially vertical partition 16b situated in the vicinity of the base 12 compartmentalizes longitudinally the space 15 situated between the two walls. This partition 16b is oriented downwards in this space 15. It is adjacent ceiling wall 13 at the top and a portion of the grid 14 at the bottom. Alternatively, the partition 16b could extend over only part of the height of the space 15.

The base 12 is intended to secure the barrier at the periphery of the area P to be protected. Its height intended to be buried is predetermined so as to optimize the stabilization of the device in the soil and to prevent gastropods from slipping under it to reach the protected area. Its predetermined height above the soil is sufficiently large to prevent the targeted gastropods from hoisting themselves directly onto the upper face of the ceiling wall 13 by adopting an upright position on their foot, before even reaching the base.

The base 12 and the ceiling wall 13 have either no interstices or interstices that are sufficiently small to prevent gastropods of the category targeted by the barrier from slipping through. In other words, the base 12 and the ceiling wall 13 may be either solid surfaces or perforated surfaces featuring small interstices.

The partitions 16a and 16b also feature either no interstices or interstices that are sufficiently small to prevent gastropods of the targeted category from slipping through. These partitions 16a and 16b serve as blocking means 2 to prevent gastropods moving into the space 15. The alignment of the base of the partition 16b with a solid portion of the grid 14 (i.e. a line of bars) advantageously prevents gastropods from attaching themselves to the base of this partition 16b.

The substantially horizontal position of the grid 14 maximizes the difficulty for gastropods to attach themselves to its external face or lower face. In fact, the weight of a gastropod attached to the lower face of a horizontal wall is directly opposite to its attachment force.

For example, in the embodiment of FIGS. 1A to 1D, the base 12, the ceiling wall 13 and the partition 16A may be made from a plastic type synthetic material resistant to ultraviolet light and the grid 14 may be made of metal (e.g. stainless steel, iron, etc.).

Alternatively, the base 12, the ceiling wall 13, the partition 16A and the grid 14 may be made of an iron wire netting (not represented) backed with a film of plastic material (not represented) that is not deformable and is resistant to ultraviolet light. The base 12, the ceiling wall 13, the partition 16A and the grid 14 can therefore constitute different portions of the same grid (or lattice) folded on itself. More generally, the partition 16A alone, the partition 16A and the ceiling wall 13, or the partition 16A and the ceiling wall 13 and the base 12 may be made in one piece with the grid 14.

This embodiment, using practical materials that can be manipulated by a craftsperson, is merely one nonlimiting example of the materials that may be chosen for the production of the device. It is compatible with maintaining the shape of the base 12, the ceiling wall 13, the grid 14 and the partition 16a. The small thickness of the base 12 facilitates pushing it into the soil. The non-deformable plastic film makes it possible to block the empty spaces encircled by the grid meshes (not represented): it therefore prevents slugs from slipping through these meshes. The resistance to deformation of this plastic film covering and it being pressed against the grid prevent gastropods from clearing a passage between these two elements. The resistance of the film to ultraviolet light optimizes the durability of the barrier, which is generally intended to be installed outdoors.

In the embodiment represented in FIGS. 1A to 1D, the grid 14 consists of a metal wire netting (e.g. approximately 1 mm thick) featuring meshes surrounding empty spaces of square shape (e.g. with a side length of approximately 13 mm). These dimensions, which correspond to the standard sizes adopted by numerous grid manufacturers, are given by way of nonlimiting example.

This configuration of the grid 14 may allow large slugs and gastropods to pass a front portion of their body through the grid sections but prevents these creatures from attaching themselves to its lower surface. The dimensions of the empty spaces surrounded by the grid sections are also sufficiently small to prevent the targeted creatures from advancing by attaching themselves to the internal face or lower face of the ceiling wall 13.

The predetermined height of the partition 16a confers on the space 15 a sufficient height to prevent gastropods of the targeted category from crawling upside down by simultaneously attaching themselves to the lower faces of the grid 14 and the ceiling wall 13.

This predetermined height of the space 15 may be less than the height of the back of most large gastropods. This relatively low height of the space 15 prevents or deters the creatures from advancing into the space 15.

The partition 16b situated near the base 12 also contributes to blocking the progress of the targeted creatures to the confines of the base 12 and of the grid 14, i.e. the edge of this grid 14.

The relatively low height of the space 15 and the partition 16b constitute blocking means in the sense of the present description. These blocking means may be used in combination, as in the example represented, or used alone. In particular, an embodiment with no partition 16b and having only the relatively low height of the space 15 as blocking means may be envisaged.

The predetermined width of the grid 14 is sufficiently large to prevent the targeted gastropods from straddling this grid 14 by attaching themselves simultaneously to the base 12 and to the external face of the partition 16a (and then to the upper face of the ceiling wall 13).

Large slugs that proceed along the base 12 can therefore possibly pass a small front portion of their body into one of the mesh of the grid 14 adjacent the base 12 but their progress is then stopped at the edge of this grid 14 because the aforementioned blocking means prevent them from advancing into the space 15 and because the grid 14 has both an attachment area that is too small to enable a slug to progress on the lower face of the grid and too great a width to be straddled.

Alternatively, the grid 14 of the device shown in these FIG. 1 may have stainless steel square meshes. For example, these meshes may have a side length of approximately 6.5 mm and a thickness of approximately 0.2 mm and the space 15 may have a height of approximately 3 mm. These dimensions of the grid 14, given by way of example, make it possible to reduce the attachment area to the point of preventing small and large slugs from attaching themselves thereto. The dimensions of these grid sections as well as the height of the space prevent small and large slugs from advancing by straddling the lower faces of the grid and the ceiling wall. This height of the space is also sufficiently small to prevent most slugs from moving around in this space and crawling over the lower face of the ceiling wall or over the upper face of the grid. This variant therefore makes it possible to block the passage of most slugs.

FIGS. 1E to 1G show three views of another variant of the first embodiment shown in FIGS. 1A to 1D. This variant features an inclined grid and a rod disposed under this grid.

FIG. 1E is a cross section of the barrier, the section plane passing between two meshes at the level of the attachment of the rod to the ceiling wall.

FIG. 1F is a cross section of the barrier, the section plane passing between two meshes and through the rod.

FIG. 1G is a cross section of the barrier, the section plane passing through a mesh and through the rod.

In this variant, the ceiling wall 13 and the grid 14 diverge from the vertical without being horizontal. A rod 17 is coupled to the ceiling wall at both its ends via lugs 19. This rod 17 extends in the longitudinal direction of the barrier 11b is. This rod 17 can have a section with a diameter of 0.5 mm and be situated approximately 4 mm from the grid 14 in a transverse plane. Despite these divergences, the base 12, the ceiling 13, the grid 14, the space 15 and the partitions 16a, 16*b* have properties analogous to those of the elements with the same references in the example from FIGS. 1A-1D.

The rod 17 has a sufficiently small section to prevent slugs attaching themselves to it transversely. The distance that separates this rod 17 from the grid 14 is sufficiently small to prevent large slugs from slipping between the rod 17 and the grid 14.

The rod 17 therefore prevents the slugs from advancing onto the lower face of the grid 14.

Second Embodiment

A second embodiment of the protection device is intended to protect an area P delimited by a plant pot or support S from invasion by slugs from the small size category. This embodiment comprises a barrier 21 shown in:

FIG. 2A, which is a perspective view of a plant pot in which the protection device is concealed by the rim of the pot, FIG. 2B, which is a view of the pot in vertical section on a plane intersecting a transverse partition 27 on one side of the pot and passing between two transverse partitions 27 on the other side of the pot, FIG. 2C, which is a view to a larger scale of a targeted part of FIG. 2B, and FIG. 2D, which is a view in section at the level of the grid 24.

In this embodiment the base 22 inclined to the vertical and the ceiling wall 23 inclined to the horizontal are integrated into the support S, that is to say here into a plant pot. In other words, the bottom and the lateral wall of the plant pot form the base 22 while the rim at the top of the pot forms the ceiling wall 23.

The grid 24 is substantially parallel to the ceiling wall 23. The meshes of the grid 24 are joined to the lower edges of a plurality of longitudinal partitions 26 (see FIG. 2C) and transverse partitions 27 (see FIG. 2B) that cross each other. These partitions 26, 27 are approximately 3 mm high, for example. The upper edges of the crossing partitions are contiguous with the ceiling walls 23. These partitions either do not feature any interstice or feature interstices sufficiently small to prevent slugs of the category targeted by this barrier 21 from getting through. The crossing over of these partitions contributes to blocking the advance of slugs into the space 25 situated between the ceiling wall 23 and the grid 24.

In the embodiment represented in FIGS. 2A to 2D, the grid 24 consists of a wire netting comprising metal wires (for example approximately 0.5 mm in diameter in cross section) having meshes surrounding empty spaces of square shape (e.g. with a side length of approximately 6.6 mm).

The predetermined width of the grid 24 (e.g. approximately 20 mm) is sufficiently large to prevent slugs of the targeted category from straddling it.

The sections of the meshes of the grid 24 and the dimensions of the spaces that they surround are predetermined so as to confer an attachment area of the grid that is sufficiently small to prevent slugs of the targeted category from attaching themselves thereto.

The height of the compartmented space 25 separating the ceiling wall 23 from the grid 24 is sufficiently large to prevent slugs of the category targeted by the barrier from progressing by straddling the lower faces of these two parts 23, 24.

The crossing over of the transverse partitions 27 and the longitudinal partitions 26 prevents or deters small snails from crawling upside down on the lower surface of the ceiling wall 23. This crossing over constitutes blocking means in the sense of the present disclosure.

Figure 2E:
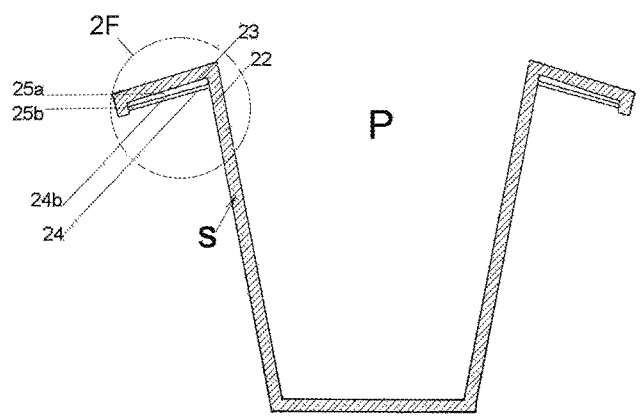
FIGS. 2E and 2F show two views of a variant of the device from FIGS. 2A-2D.
Figure 2F:
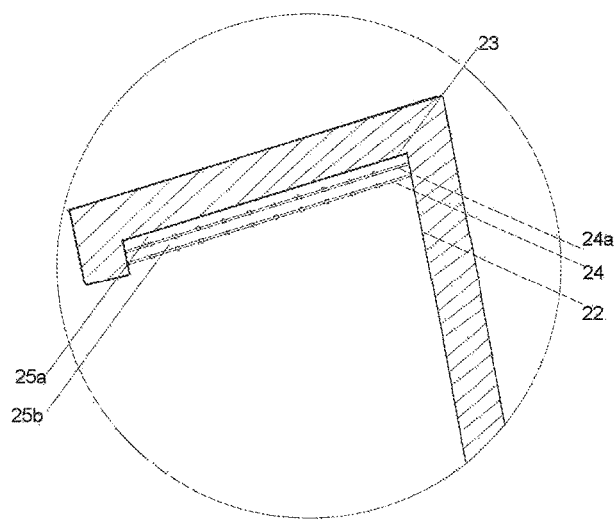

In the variant represented in FIGS. 2E and 2F, the crossing over of the longitudinal partitions 26 and the transverse partitions 27 of the device shown in FIGS. 2A to 2D is replaced by an intermediate grid 24*a* the same size as the grid 24. The grid 24 and the grid 24*a* are face-to-face and 50 mm wide, for example. Rather than being offset relative to one another, the meshes of the grids 24 and 24*a* may be aligned (i.e. disposed symmetrically with respect to a median plane extending between the grids 24 and 24*a*). The sub-space 25*a* created between the ceiling 23 and the intermediate grid measures 2 mm, for example. The sub-space 25*b* created between the intermediate grid 24*a* and the grid 24 measures 3 mm, for example. The meshes of the grids 24 and 24*a* may be the same shape and have the same dimensions. For example, they may be square meshes with a side length of approximately 6.5 mm and approximately 0.2 mm thick. Apart from these differences, the elements of the variant shown in FIGS. 2E-2F have the same properties as the elements with the same references shown in FIGS. 2A-2D.

The different heights of the sub-spaces 25*a* and 25*b* defined by the disposition of the intermediate grid 24*a* make it possible to stop creatures of different sizes. The dimensions of the grids combining, for example, grid sections with a side length of 6.5 mm and a thickness of 0.2 mm make it possible to reduce their adhesion area to the point of preventing small and large slugs from attaching themselves. Moreover, the sufficiently large width of the grids 24 and 24*a* (e.g. 50 mm or more) prevents small and large slugs from straddling these grids.

Third Embodiment

FIGS. 3A to 3D show a protection device intended to be installed in the soil and to constitute an obstacle to slugs from two different size categories.

This embodiment includes a barrier 31 shown in:

FIG. 3A, which is a perspective view of a barrier 31 intended to be installed in the soil (not represented), FIG. 3B, which is a view in horizontal section at the level of the grid 34*a* from FIG. 3A, FIG. 3C, which is a view in cross section of the barrier 31, the section being taken at the level of the empty spaces situated between the meshes of the grid 34*a*, FIG. 3D, which is a view in cross section of the barrier 31, the section being taken at the level of the portions of the meshes of the grid 34*a* perpendicular to the base.

This device includes a barrier 31 consisting of a barrier 31*b* interleaved within a barrier 31*a*.

The barrier 31*a* targets large slugs. Its base 12 and its partition 16*a* have properties analogous to the elements with the same references of the barrier 11, possibly apart from a height difference of a few millimeters. Their properties will therefore not be described further.

The upper part of the base 12 situated on the side opposite the area P of plants to be protected and the edge of the ceiling walls 33 respectively serve as base 32 and ceiling wall 33*b* of an interleaved barrier 31*b* targeting small slugs.

In this third embodiment of the device, the ceiling wall 33 has a thickness that is slightly increased in the portion situated between the edge of the interleaved barrier 31*b* and the partition 16*a*.

The lower edge of the partition 16*a* is joined to a substantially horizontal grid 34*a* that extends in the direction of the base 12. The sections and the dimensions of the meshes of the grid 34a have properties analogous to the meshes of the grid 14 of the barrier 11, with the exception of meshes of the row of meshes nearest the base 12.

Indeed, these meshes have only three sides. They have no fourth side facing the base 12 and the free ends of these open meshes point toward the base 12 without touching it, in order to deter small slugs from reaching the grid 34a. Indeed, small slugs proceeding along the base 12 are not incited to launch their body into the void to then attach themselves to one of the open meshes of this wall.

Alternatively, compared to the barrier 11 described above, the grid sections nearest to one of the longitudinal edges of this grid 34a have only three sides (see FIG. 3B). When two barriers are juxtaposed, the attachment area of the two adjacent grids 34a therefore remains small at the level of the join.

The upper part of the base 12 situated on the side opposite the area P of plants to be protected and the edge of the ceiling wall 33 respectively serve as base 32 and ceiling wall 33b of the interleaved barrier 31b.

This barrier 31b targets small slugs. The meshes of its grid 34b are joined to the lower edges of a plurality of longitudinal partitions 36 and transverse partitions 37 that cross over one another. The side of the meshes of the row nearest the base is integral with the base. The arrays of partitions 36 and 37 will not be described further because apart from their rectilinear rather than curved shapes their properties are identical to the corresponding elements of the barrier 21 from FIGS. 2A and 2D.

Apart from its rectilinear rather than circular direction, the grid 34b has the same properties as the grid 24 of the barrier 21. Moreover, it also serves as a ceiling wall for large slugs.

The space 35a situated between the grid 34a and the grid 34b has the same properties as the space 15 of the barrier 11 targeting large slugs, although its height is slightly lower.

The height of the space 35a situated between the grid 34a and the grid 34b is determined so as to have a height slightly lower than the height of the space 15 of the barrier 11 at the same time as retaining properties analogous to that space 15.

The thickness of the ceiling wall 33 facing the space 35 is determined so that this space 35 has a height slightly greater than the height of the space 15 of the barrier 11 at the same time as retaining properties analogous to that space 15.

These adjustments of the thickness of the ceiling wall 33 and of the heights of the spaces 35a and 35 make it possible to incorporate the height of the barrier 31b within the barrier 31a at the same time as retaining for the spaces 35 and 35a the properties and advantages of the space 15 of the barrier 11 targeting large slugs.

Alternatively, the ceiling wall 33 could have been thinned compared to the barrier 31b or a constant thickness but a crenellated shape suited to the heights required for the spaces 35 and 35a.

Two partitions 16b having the same properties and the same advantages as the partition 16b of the barrier 11 are disposed in the space 35. They will not be described further.

This third embodiment of the device including two interleaved barriers therefore makes it possible to block the advance of terrestrial gastropods belonging to the small and large size categories.

Figure 4:
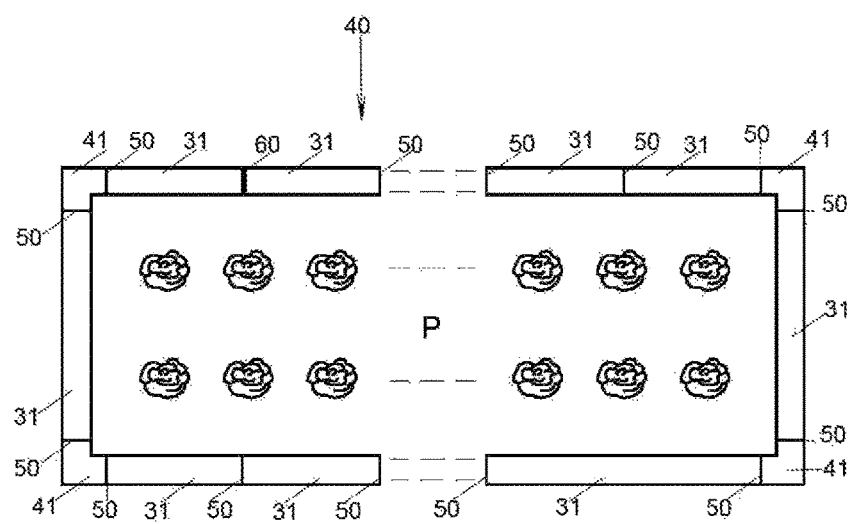
FIG. 4 is a plan view of a protection device including a plurality of barriers joined to form an enclosed area.

In the embodiment shown in FIG. 4, the protection device referenced 40 as a whole comprises four corner barriers 41, a plurality of rectilinear barriers 31 identical to the barriers 31 described above, as well as junction means 50 and junction means 60 disposed at the junctions of adjacent barriers.

This protection device 40 forms a rectangle surrounding an area P of plants to be protected against invasion by terrestrial gastropods.

Apart from their angular shapes, the barriers 41 have the same properties and advantages as the rectilinear barriers 31. Their elements will therefore not be described further.

The junction means 50 shown in detail in FIGS. 5A to 5E aim to facilitate the accurate alignment of two adjacent barriers. They also make it possible to block the residual gap between these two barriers in order to prevent gastropods from slipping through.

Figure 6A:
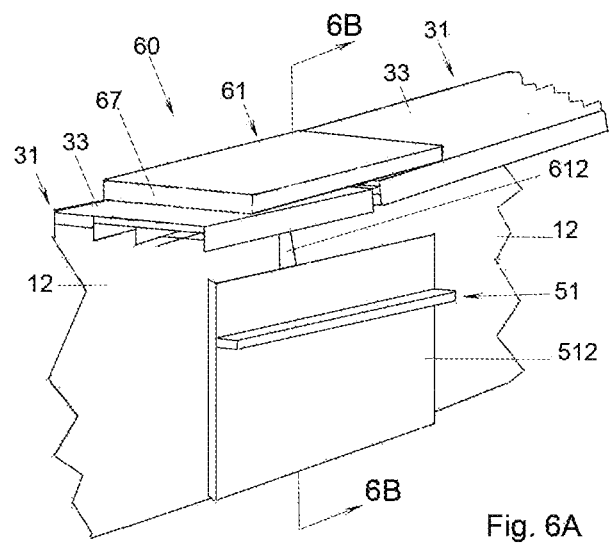
FIGS. 6A and 6B show two views of junction means intended to connect two adjacent barriers that are inaccurately aligned.
Figure 6B:
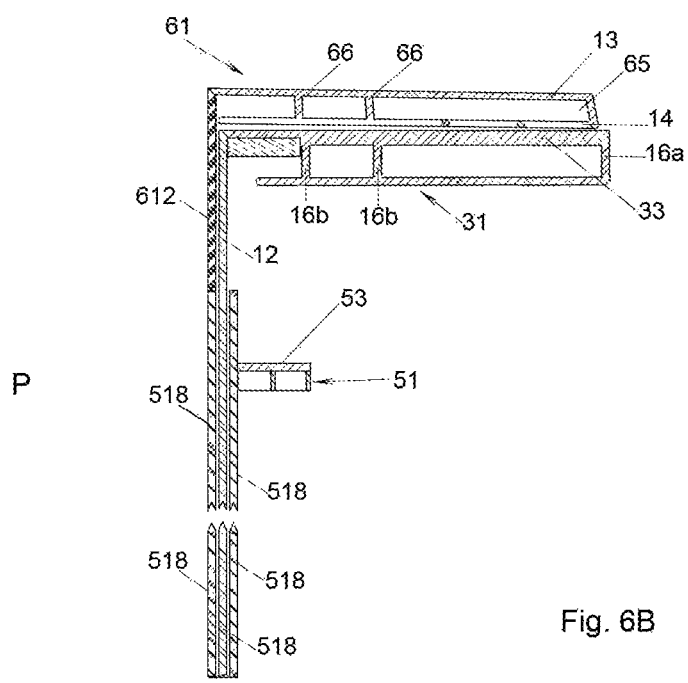
Figure 7A:
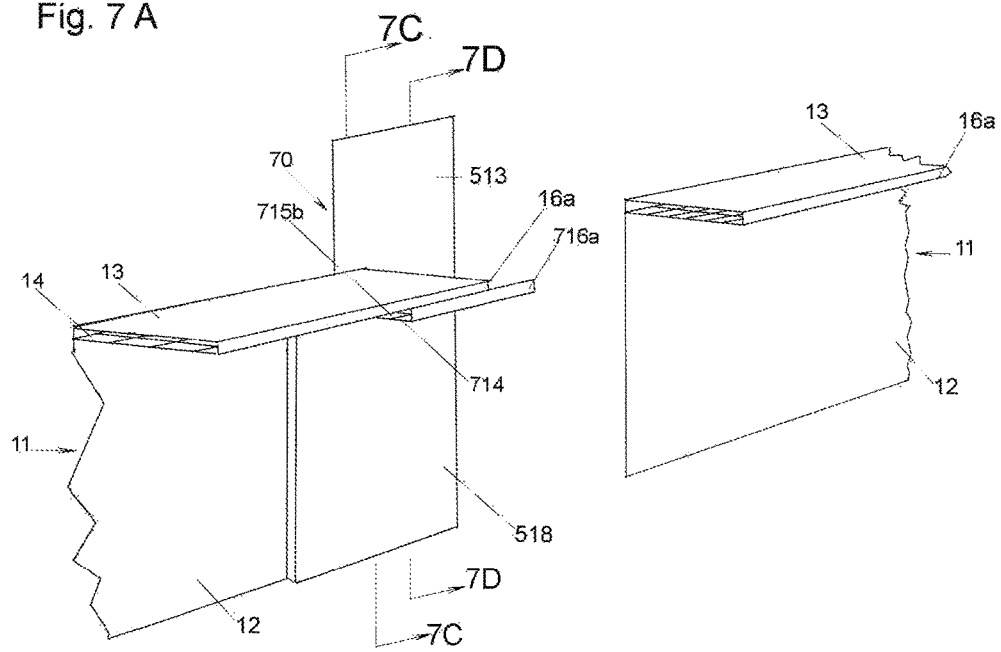
FIGS. 7A to 7E show five views of a third example of junction means intended to connect two adjacent barriers.
Figure 7B:
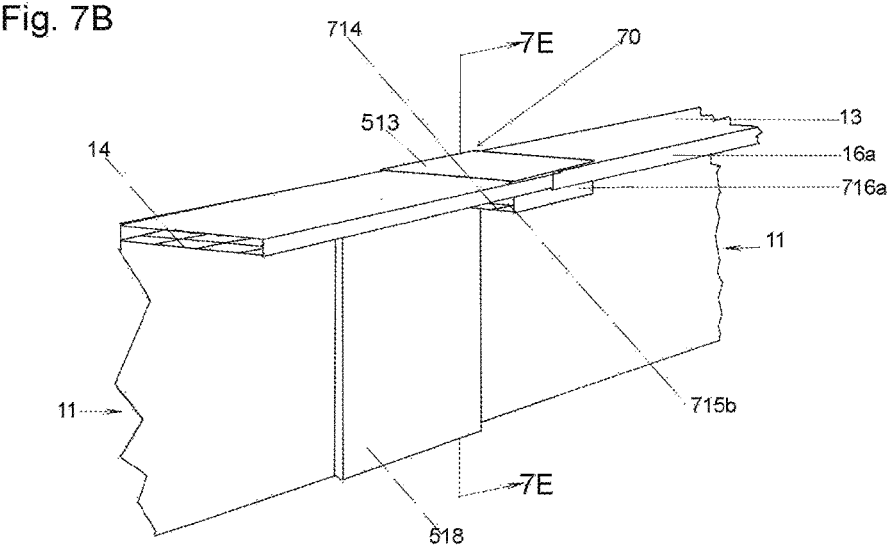
Figure 7C:
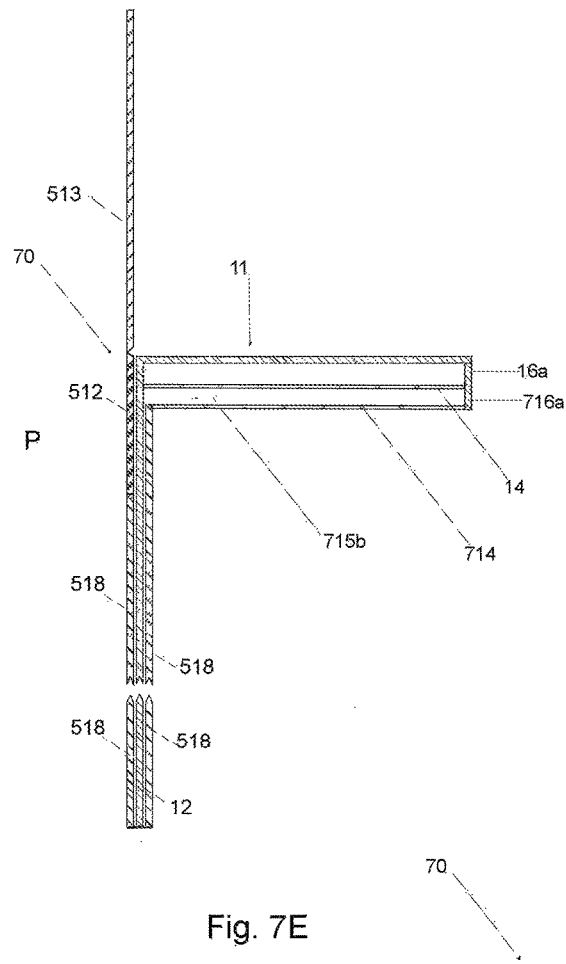
Figure 7D:
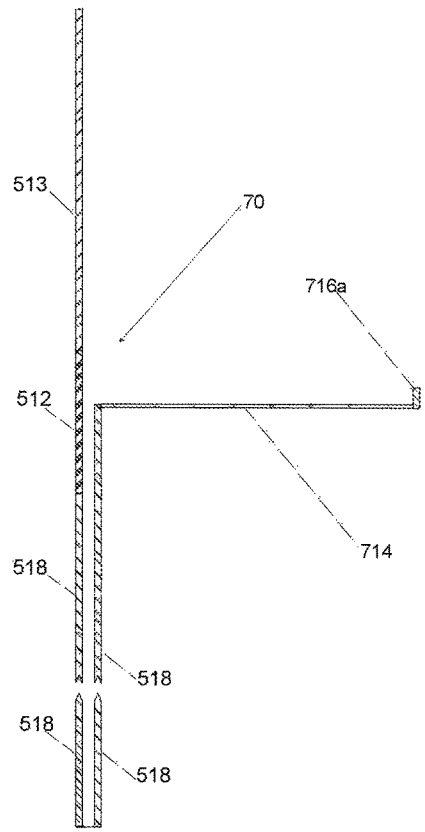
Figure 7E:
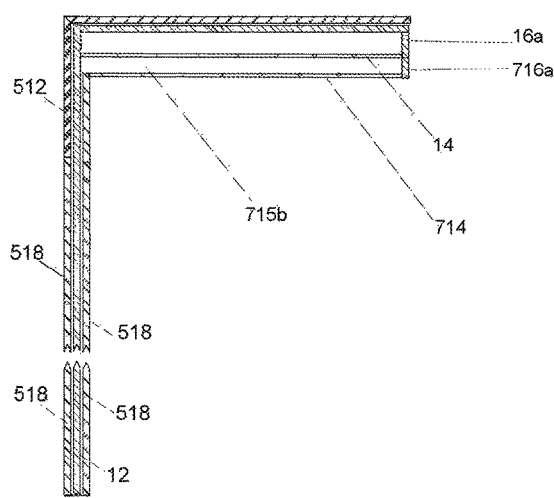

The junction means 60, shown in detail in FIGS. 6A and 6B, makes it possible to prevent large and small gastropods from slipping into the gap between two adjacent barriers 31 that are not accurately aligned.

The embodiment of the junction means 50 between two adjacent barriers 31 shown in FIGS. 5A to 5E comprises a sliding bracket 518, a barrier 51 targeting small gastropods 51, a base 512, a ceiling wall 513 and means (not represented) for attaching the junction means 50 to the barriers 31.

Figure 5A:
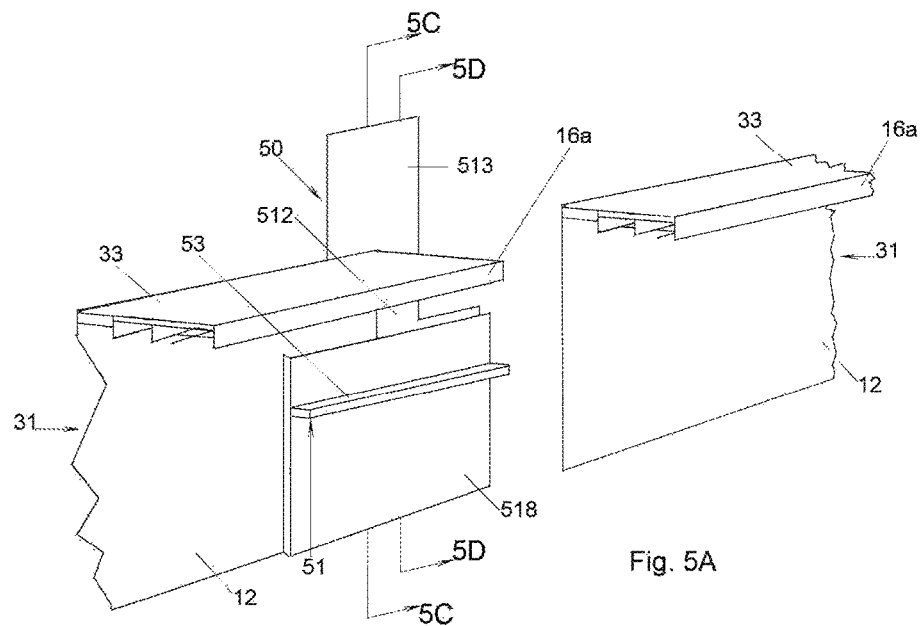
Figure 5B:
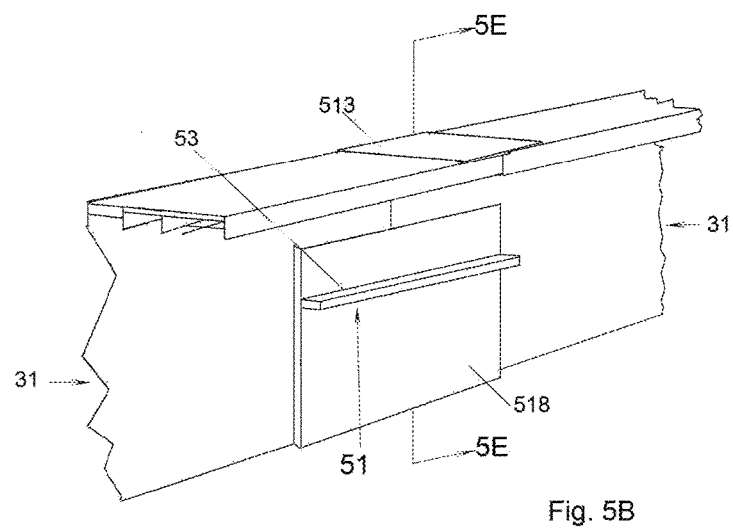

These elements are represented in:

FIG. 5A, which is a perspective view of two barriers 31 that have not been joined, FIG. 5B, which is a perspective view of two barriers 31 that have been joined, FIG. 5C, which is a view in section of the junction means 50 on the section plane 5C of FIG. 5A, FIG. 5D, which is a view in section of the junction means 50 on the section plane 5D of FIG. 5A, FIG. 5E, which is a view in section of the junction means 50 secured in position on the section plane 5E of FIG. 5B.

The base 12 of each barrier 31 comprises a substantially plane wall at one end and at the other end a bracket 518 intended to cooperate with the plane wall of the base 12 of the adjacent barrier 31, in accordance with the principle of a sliding connection.

The base (not represented) of a barrier 51 targeting small gastropods is interleaved in the wall of the bracket 518 situated on the side opposite the area P of plants to be protected. Apart from its width suited to small gastropods, the ceiling wall 53 of this barrier 51 has the same properties as the ceiling wall 13 of the barrier 11. The other elements of this barrier 51 have the same properties as the barrier 31b described for the third embodiment of the device. They will therefore not be further described.

As represented in FIGS. 5A to 5E, the wall of the bracket 518 situated on the same side as the area P of plants to be protected is joined to a base 512 intended to be pressed against the edges of two bases 12 not covered by the bracket 518. This base 512 is extended by a ceiling wall 513 intended to be pressed against the upper faces of the edges of the two ceiling walls 33 of the two adjacent barriers 31. This ceiling wall 513 is advantageously connected to the barrier 31 by attachment means (not represented) such as, for example but not exclusively, staples, rivets, hooks, adhesive tapes.

The bracket 518 optimizes the alignment of the two adjacent barriers 31. It also prevents terrestrial gastropods from reaching the junction area that it blocks.

The base 512 and the ceiling wall 513 block the junction area situated beyond the bracket 518. They therefore prevent large slugs from slipping between the two adjacent barriers 31.

The barrier 51 prevents small gastropods from reaching the junction area situated above this barrier 51.

FIGS. 6A and 6B show an embodiment of the junction means 60 that enables effective junction of two barriers 31 the adjacent faces 12 of which are not accurately aligned, for example because of the stony nature of the soil, or when joining the first and the last barriers of a large enclosure.

The junction means 60 comprise the same elements as the junction means 50 apart from the base 512 and the ceiling wall 513, which are replaced by a barrier 61, the ceiling wall 13 and the grid 14 of which have the same properties as the elements with the same references of the barrier 11 shown in FIG. 1. The space 65 situated between the ceiling wall and the grid 14 is compartmentalized by longitudinal partitions 66 and transverse partitions 67 that cross over one another and feature either no interstices or interstices that are sufficiently small to prevent large slugs from slipping through.

The base 612 of this barrier 61 is intended to be secured to the wall of the bracket 518 situated on the same side as the area P of plants to be protected. It has the same properties as the base 12 of the barrier 11 except for its height, which is predetermined so as to allow the grid 14 of the barrier 61 to be pressed against the edges of the two walls 33 of the two adjacent barriers 31.

This barrier 61 pressed against the junction between two adjacent barriers 31 prevents large slugs from slipping into the gap separating these two adjacent barriers 31 that are not accurately aligned.

The longitudinal partitions 66 and transverse partitions 67 of the space 65 prevent gastropods from slipping into this space 65 to exit the junction means.

FIGS. 7A to 7E represent five views of a third example of the junction means 70 that make possible the effective junction of two barriers 11 whether their adjacent bases 12 are aligned accurately or inaccurately. The third example of the junction means 70 comprises a connecting barrier (not referenced) nested on and straddling the two joined barriers 11. The sliding bracket 518, the base 512 and the ceiling wall 513 are analogous to the first example of the connecting means 50 with the exception of the face of the sliding bracket 518 situated on the side opposite the area of plants to be protected. In fact, this face extends upwards a few millimeters below the two joined grids 14. The free edge of this face of the sliding bracket 518 is joined to a grid 714 having the same width and the same mesh dimensions as the grids of the two joined barriers 11. The free edge of this grid 714 is joined over all its length to the base of a partition 716a the height of which is identical to the distance separating the grids 14 of the joined barriers of the upper edge of the sliding bracket 518. The height of the sub-space 715b separating the grid 714 from the grids 14 of the barriers 11 that have been joined is sufficiently small to prevent slugs from slipping through. The partition 716a is attached to the two joined barriers 11 or to the ceiling 513 by clips, ties, staples or adhesive tapes (not represented).

The predetermined height of the face of the sliding bracket 518 situated on the side opposite the area of plants to be protected and the predetermined dimensions of the grid 714, the sub-space 715b and the partition 716a prevent slugs from reaching the junction line between the two joined barriers.

The protection devices described above make it possible to protect an area P in a simple and effective manner against the invasion of terrestrial gastropods belonging to different size categories. In fact, the creatures that reach a device comprising a plurality of barriers joined by the junction means described above are obliged to turn back because they are incapable of slipping through the gaps of the device, because the height and the width of the barriers are too great to be straddled and because the creatures are prevented from progressing on the grids and the ceiling walls of these barriers.

It will be noted that the dimensions and the shapes of the materials used to produce the embodiments described above and represented in the various figures have essentially been chosen for their commercial availability and the ease of handling them. These choices must not in any event be interpreted as limiting the scope of the invention. Moreover, generally speaking, the embodiments or examples described in the present description are provided by way of illustration and are not limiting on the invention, a person skilled in the art, seeing this description, being easily able to modify these embodiments or examples, or to envisage others, whilst remaining within the scope of the invention.

For example, the dimensions cited may therefore be increased or reduced. The barriers may have curved or polygonal shapes. The barriers and the junction means may take the form of a kit to be assembled. The barriers may be made at least in part of metal, of synthetic materials, for example, but not exclusively, plastic materials. The junction means between two barriers may be at least in part made from adhesive, synthetic, metal materials. These junction means may be reduced to a junction with an adhesive tape or with attachment means of staple, rivet or other type.

The bases and the ceiling walls may have varied inclinations. The free edge of the base may have a pointed shape so as to facilitate pushing it into the soil. Any part of the barrier, of the junction means, may have varied shapes and colors to enhance the visual attraction of the device (not shown). The grids may comprise a network of synthetic filaments stretched on a frame (not represented). The meshes of these grids may have polygonal shapes (not represented), convoluted shapes (not represented), or other shapes. Open and closed meshes as well as meshes with varied sections and dimensions may be present in the same grid. The rods may consist of a steel wire or a filament of any other material tensioned between two tongues. The tongues may consist of a cylindrical stud made of metal, plastic or any other material. The lengthwise and transverse partitions may be inclined, their cross sections may have rectilinear, curvilinear or polygonal shapes. These partitions may follow the undulating, angular contours of the meshes to which their lower edges are joined. The dispositions of these partitions may be varied within spaces separating the grids from the ceiling platform. The arrays of crossing partitions may have a varied number of rows, or produce cavities of different sizes. The walls intended to cross over may consist of a stack of grids with the same dimensions as the grid of the barrier to which they correspond.

Any part of the barriers may include diverticula (not represented) intended for example to facilitate securing them to the support or to one another.

Moreover, the expression "comprising a" must be understood as synonymous with "comprising at least one" unless otherwise specified.

Finally, the various features of the embodiments or examples described in the present description may be considered separately or combined with one another. When they are combined, these features may be combined as described above or differently, the invention not being limited to the specific combinations described above. In particular, in the absence of any indication to the contrary or any technical incompatibility, a feature described in relation to one embodiment or example may be applied in an analogous manner to another embodiment or example.

REFERENCE SIGNS

P: Area to be protected (e.g. area of plants)
S: Support
Barriers: 11, 21, 31, 31a, 31b, 41, 51, 61
Base: 12, 22, 32, 512, 612
Ceiling walls: 13, 23, 33, 33b, 53, 513
Grids: 14, 24, 34a, 34b, 24a, 714
Spaces separating the ceiling walls from the grids: 15, 25, 35, 35a, 35b, 65, 25a
Sub-space separating two superposed grids: 25b, 715b
Longitudinal partitions compartmentalizing the spaces cited above: 16a, 16b, 26, 36, 66, 716a
Transverse partitions compartmentalizing the spaces cited above: 27, 37, 67
Rod: 17
Lug: 19
Junction means between two barriers: 50, 60, 70
Sliding bracket: 518

The invention claimed is:

1. A device for protection of an area against terrestrial gastropods including at least one barrier comprising:
   a base that secures the barrier to the periphery of the area to be protected,
   a ceiling wall joined to the base,
   a grid extending along the ceiling wall and spaced therefrom,
   a space between the ceiling wall and the grid,
   at least one blocking means in said space,
   wherein the grid is configured to prevent the gastropods from attaching themselves thereto, and wherein the blocking means comprise at least one intermediate grid disposed along said ceiling wall, between the ceiling wall and the grid.

2. The protection device according to claim 1, wherein the grid is located below the ceiling wall, the ceiling wall being intended to be oriented toward the outside of the area to be protected in a direction diverging from the vertical.

3. The protection device according to claim 1, wherein the grid extends substantially parallel to the ceiling wall.

4. The protection device according to claim 1, wherein said base is at least partially integrated in a support delimiting the periphery of the area to be protected.

5. The protection device according to claim 1, wherein the ceiling wall is at least partially integrated in a support defining the periphery of the area to be protected.

6. The protective device according to claim 1, wherein an external face of said grid has mesh sections and inter-mesh empty space dimensions configured to prevent said gastropods to crawl on this external face.

7. The protective device according to claim 1, wherein sizes of inter-mesh empty spaces of the grid are configured to prevent said gastropods from crawling on an internal face of said ceiling wall.

8. The protective device according to claim 1, wherein said space has a height configured to prevent said gastropods from straddling on an external face of the grid and on an internal face of the ceiling wall.

9. The protective device according to claim 1, wherein the height of said space is configured to prevent or deter said gastropods from slipping therethrough.

10. The protective device according to claim 1, wherein said at least one blocking means is at least one partition wall disposed longitudinally and oriented downwards in said space.

11. The protective device according to claim 10, wherein said or one of said partition walls is located close to the said base so as to block the progression of the gastropods at the beginning of said grid.

12. The protective device according to claim 1, wherein said grid is configured to prevent said gastropods from straddling this grid.

13. The protective device according to claim 1, wherein at least two barriers are fitted into each other.

14. The protective device according to claim 13, wherein at least a portion of the grid of one of said barriers serves as a ceiling wall to another of said barriers.

15. The protective device according to claim 13, wherein at least one portion of said base of one of said barriers serves as a base to another of said barriers.

16. The protective device according to claim 1, comprising two adjacent barriers and junction means for joining the two adjacent barriers, these junction means comprising at least one barrier of the aforementioned type.

17. The protective device according to claim 1, wherein said space is partitioned into at least two sub-spaces by the least one intermediate grid.

18. The protective device according to claim 1, wherein at least one rod is disposed longitudinally along an outer face of the grid at a distance from said grid.

19. The protective device according to claim 1, wherein the at least one intermediate grid extends parallel to the ceiling wall.

* * * * *